United States Patent [19]

Pfeiffer

[11] 4,290,471
[45] Sep. 22, 1981

[54] BUILT-UP CORE FOR THE BEAD OF A PNEUMATIC TIRE FOR WHEEL RIMS WITH INCLINED SHOULDERS

[75] Inventor: Herbert Pfeiffer, Hemer, Fed. Rep. of Germany

[73] Assignee: Otto Kuhlmann GmbH & Co. KG, Hemer, Fed. Rep. of Germany

[21] Appl. No.: 105,657

[22] Filed: Dec. 20, 1979

[30] Foreign Application Priority Data

Jan. 10, 1979 [JP] Japan .................................. 54-760

[51] Int. Cl.³ .............................................. B60C 15/04
[52] U.S. Cl. .................................. 152/362 R; 245/1.5
[58] Field of Search ...... 152/362 R, 362 CS, DIG. 9; 156/131–132, 135–136; 140/88; 245/1.5

[56] References Cited

U.S. PATENT DOCUMENTS

| | | | |
|---|---|---|---|
| 3,142,327 | 7/1964 | Herzegh | 152/362 R |
| 3,949,800 | 4/1976 | Lejeune | 152/362 R |
| 4,166,492 | 9/1979 | Pfeiffer | 152/362 R |

Primary Examiner—John T. Goolkasian
Assistant Examiner—Lois E. Boland
Attorney, Agent, or Firm—Birch, Stewart, Kolasch & Birch

[57] ABSTRACT

In a built-up core for the bead of a pneumatic tire, the wires (A,B,C) of each lay (8) of the built-up core (4) are of a trapezoidal cross section. Between the wires (A,B,C) of each lay (8) of wire and the wires (A,B,C) of the next, overlying lay (8) of wire, there are wedge-shaped clearances (9). As a result, the wires (A,B,C) of each lay (8) of wire find a support on the edges of the wire of the underlying lay of wires so that they cannot be displaced against each other during the production of the tire.

2 Claims, 3 Drawing Figures

BUILT-UP CORE FOR THE BEAD OF A PNEUMATIC TIRE FOR WHEEL RIMS WITH INCLINED SHOULDERS

BACKGROUND OF THE INVENTION

The invention relates to a ring-like built-up core, of the shape in cross-section of a parallelogram, for the bead of a pneumatic tire for wheel rims with inclined shoulders, the radially-inward surface of the core being inclined in relation to the direction of the axis of the pneumatic tire to be parallel to the bead seat, the wires of the core being trapezoidal in cross-section and disposed side-by-side in lays of wire and being wound in several lays upon a support conically shaped to conform to the inclination of the shoulder of the wheel rim.

As is well known, the bead of a pneumatic tire serves for the sealing of the tire to the wheel rim and for the taking up or transmission of the complex transverse and longitudinal forces occurring.

It is known to manufacture the ring-like built-up core from lays of wire formed of wires of rectangular cross section disposed compactly side by side, several of which lays are wound over one another compactly as the built-up core upon a support which is conical in conformity with the inclination of the wheel rim shoulder. There have been proposed, particularly for pneumatic tires for wheel rims with inclined shoulders, ring-like built-up cores, of the shape of a parallelogram in cross-section, in which the lays of wire are wound compactly over one another in such a way that the radially inward core surface is inclined parallel to the bead seat. (Preliminarily published Federal German Specification No. b 24 10 750). Theoretically, such a ring-like built-up core of the shape of a parallelogram in cross-section with a core inward surface inclined relative to the horizontal can be most easily manufactured from single wires which in cross-section have the shape of a correspondingly matched parallelogram.

In this way there could be formed built-up cores in which all of the individual wires are trued up in the laying direction and superposed vertically. In practice, however, it is found that small individual wires, which in cross-section are of the shape of a parallelogram, are difficult to produce, it being not possible particularly to preserve the necessary tolerances.

It has been found, moreover, that the compact areal superpositioning of the individual wires of the lays of wire is difficult in practice and the cohesion of the built-up core can be compromised by jumping over of individual wires.

SUMMARY OF THE INVENTION

The problem which is the basis of the invention is to put forward a built-up core with which the lack of stability of the cross-sectional shape of the core is eliminated.

To solve this problem it is proposed that the wires of each lay of wire of the built-up core all have the same trapezoidal cross-section, and that clearance spaces exist between the wires of each lay and the corresponding wires of the next lay of wire.

What is achieved in this way is that on winding the lays of wire to form the ring-like core, the parallelogram-like cross-section of the ring automatically results and the clearance spaces between the individual lays of wire prevent any jumping over of the individual wires, as here no area displacement takes place between the wire. The built-up core ensures an excellent taking up or transmission of the complex transverse and longitudinal forces occurring and therewith contributes substantially to the increased durability of the pneumatic tire.

In an advantageous development of the invention provision is made for the narrower ends of all wires of the built-up core to be directed in the same direction towards the outside of the pneumatic tire and for the narrower ends of the wires of one lay of wires to be supported on the broader ends of the wires of the next lay of wire. By this means the production of the inherently stable built-up core is simplified.

The clearance spaces between the lays of wire—seen in cross-section—have a wedge shape.

There are also, between the wires of each individual lay of wire wedge-shaped clearance spaces which—when seen in cross-section—appear to be perpendicular to the wedge-shaped clearance spaces between the lays of wire.

The clearance spaces result in the mutually confronting surfaces of all wires not being situated areally against one another either in the radial or in the axial direction of the pneumatic tire. There is no areal metal-on-metal contact. Essentially the only contact which takes place is along lines.

DETAILED DESCRIPTION

The invention is explained hereinafter in more detail with the aid of an illustrated embodiment.

FIG. 3 is a cross-section through an individual wire.

Figure 1:
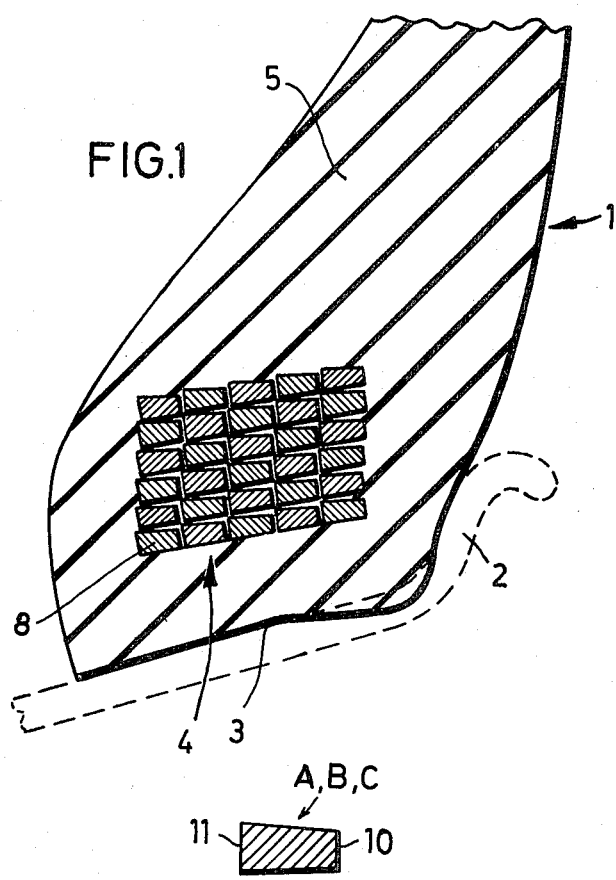
FIG. 1 shows a section through the bead of a pneumatic tire on a wheel rim inclined shoulder.
Figure 2:
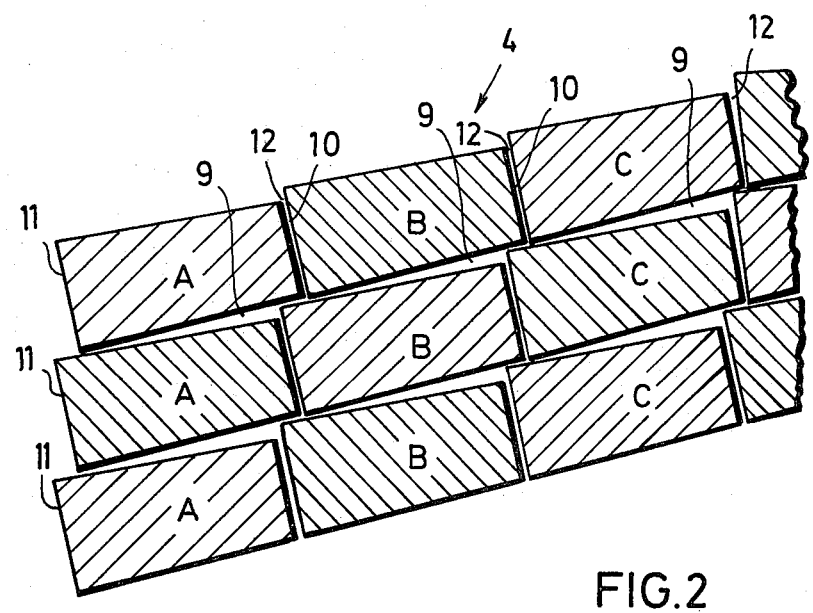
FIG. 2 is a sectional view on a larger scale through the built-up core.

A bead 1 of a tubeless pneumatic tire rests with its seating surface 3 against an inclined shoulder 2 of a corresponding wheel rim. In conformity with the formation of the wheel rim, the seating surface 3 of the bead 1 is inclined to the horizontal.

In the interior of the bead 1 there is wrapped around a ring-like core 4 of trapezoidal section a carcass course 5 which is reinforced with steel mesh.

The built-up core has an approximately parallelogram-like cross-section. It consists of lays 8 of wire wound over one another and which are formed by individual wires A, B, C which are of trapezoidal shape in cross-section.

The narrower ends 10 of all wires A, B, C of the built-up core are directed in the same direction towards the outside surface of the bead 1 and are supported on the broader ends 11 of the wires A, B, C of the next lay 8 of wire in such a way so as to provide clearance spaces 12 between the consecutive narrower and broader ends of the individual wires A, B, C of each individual wire lay. Because of this arrangement there are clearance spaces 9 between the opposite surfaces of the individual wires A, B and C of each corresponding wire lay.

Because of the clearance spaces 9 and 12 the wires A, B, C in one lay 8 of wire and in the wire lays wound on one another are in contact only along lines. There is no areal metal-on-metal contact.

I claim:

1. A ring-like built-up core of the shape in cross-section of a parallelogram for the bead of a pneumatic tire for wheel rims with inclined shoulders, the radially-inward surface of the core being inclined in relation to the direction of the axis of the pneumatic tire so as to be parallel to the bead seat which core comprises lays of wire disposed side-by-side wound over one another upon a support conically shaped to conform to the inclination of the shoulder of the wheel rim and which lays are formed by individual wires trapezoidal in cross-sections so as to have narrower and broader ends, the narrower ends of all the wires of the built-up core being directed in the same direction towards the outside surface of the pneumatic tire bead such that the narrower ends of the wires of one lay of wire are supported on the broader ends of the wires of the next lay of wire so as to provide clearance spaces between the consecutive narrower and broader ends of the individual wires of each individual wire lay and clearance spaces between the opposite surfaces of the wires of each lay of wire and the corresponding wires of the next lay of wire.

2. The ring-like built-up core as disclosed in claim 1 wherein said clearance spaces are wedge shaped.

* * * * *